United States Patent
Sudale

(10) Patent No.: US 9,482,598 B2
(45) Date of Patent: Nov. 1, 2016

(54) AXLE ALIGNMENT SENSOR ASSEMBLY FOR STEERING SYSTEM OF A MACHINE

(71) Applicant: Caterpillar Inc., Peoria, IL (US)

(72) Inventor: Steven J. Sudale, Rugeley (GB)

(73) Assignee: Caterpillar Inc., Peoria, IL (US)

( * ) Notice: Subject to any disclaimer, the term of this patent is extended or adjusted under 35 U.S.C. 154(b) by 111 days.

(21) Appl. No.: 14/594,215

(22) Filed: Jan. 12, 2015

(65) Prior Publication Data

US 2015/0121709 A1    May 7, 2015

(51) Int. Cl.
*G01B 7/30* (2006.01)
*G01M 17/06* (2006.01)
*B62D 15/02* (2006.01)
*G01B 7/31* (2006.01)

(52) U.S. Cl.
CPC .......... *G01M 17/06* (2013.01); *B62D 15/0225* (2013.01); *G01B 7/31* (2013.01)

(58) Field of Classification Search
CPC .... G01M 17/09; B62D 15/0225; G01B 7/31
USPC .............................................. 33/203, 203.18
See application file for complete search history.

(56) References Cited

U.S. PATENT DOCUMENTS

| 4,341,021 | A  | * | 7/1982  | Beissbarth | G01B 7/315 33/203.18 |
| 5,163,529 | A  | * | 11/1992 | Clement    | B62D 15/0225 180/400 |
| 2009/0234541 | A1 | * | 9/2009 | Kramer     | B62D 5/049 701/42 |
| 2010/0019465 | A1 | * | 1/2010 | Yuta       | B60G 3/20 280/86.758 |
| 2016/0109214 | A1 | * | 4/2016 | Yuta       | B62D 17/00 33/203.18 |

* cited by examiner

Primary Examiner — G. Bradley Bennett

(57) ABSTRACT

An axle alignment sensor assembly, which includes an enclosure, an oscillator, a frequency detector, an output switch driver, a ferrite component, and an electrostatic discharge (ESD) protection component, is disclosed. The oscillator is positioned at the sensing end and is configured to generate a magnetic field. The frequency detector is positioned at the sensing end and is configured to detect the magnetic field. The output switch driver is in communication with the frequency detector and is configured to generate and deliver an output based on detection by the frequency detector. The ferrite component is positioned proximal to the connecting end and is configured to prevent electromagnetic interference. The ESD protection component is configured to protect the axle alignment sensor assembly in overvoltage conditions. The oscillator, the frequency detector, the output switch driver, the ferrite component, and the ESD protection component are encased within the enclosure.

2 Claims, 4 Drawing Sheets

US 9,482,598 B2

AXLE ALIGNMENT SENSOR ASSEMBLY FOR STEERING SYSTEM OF A MACHINE

TECHNICAL FIELD

The present disclosure relates to steering systems. More particularly, the present disclosure relates to an axle alignment sensor assembly for a steering system of a machine.

BACKGROUND

A machine, such as, an off-highway machine may include steerable front wheels and steerable rear wheels. A driver operating the machine may give commands to steer the front wheels and the rear wheels, by turning a steering wheel positioned in a cab of the machine. The driver may turn the steering wheel to align the rear wheels in the straight-ahead position before changing between steer modes. An example may be from four-wheel steering mode (4WS) to two-wheel steering mode (2WS). Axle alignment may be an additional requirement for the selection of the steer mode. The desired steer mode may be selected only if the required axle alignment is available and confirmed. This is a difficult operation, particularly if the rear wheels are not visible from the driver's normal position in the cab. Hence, the front wheels and the rear wheels may be provided with alignment sensors that communicate with a controller. The alignment sensors indicate whether the respective wheels are in an aligned position in which their axes of rotation are perpendicular to a longitudinal axis of the machine.

However, the alignment sensor may be susceptible to electromagnetic capability interference (EMC) and electrostatic discharge (ESD). For this purpose, the existing alignment sensor may be coupled to one or more protection components. However, due to exposure to certain manufacturing, finishing, and packing processes, the protection components may become damaged or may not give an optimum output. This may result in damage of the alignment sensor.

SUMMARY OF THE INVENTION

The present disclosure relates to an axle alignment sensor assembly for a steering system of a machine. The machine includes at least one axle cylinder. The axle alignment sensor assembly is coupled to the at least one axle cylinder. The axle alignment sensor assembly includes a sensing end and a connecting end.

In accordance with the present disclosure, the axle alignment sensor assembly includes an enclosure, an oscillator, a frequency detector, an output switch driver, a ferrite component, and an electrostatic discharge (ESD) protection component. The oscillator is positioned at the sensing end and is configured to generate a magnetic field. The frequency detector is positioned at the sensing end and is in communication with the oscillator. The frequency detector is configured to detect the magnetic field. The output switch driver is in communication with the frequency detector. The output switch driver is configured to generate and deliver an output based on detection by the frequency detector. The ferrite component is positioned proximal to the connecting end and is configured to prevent electromagnetic interference. The ESD protection component is positioned between the ferrite component and the connecting end. The ESD protection component is configured to protect the axle alignment sensor assembly in overvoltage conditions. The oscillator, the frequency detector, the output switch driver, the ferrite component, and the ESD protection component are encased within the enclosure.

DETAILED DESCRIPTION

Figure 1:
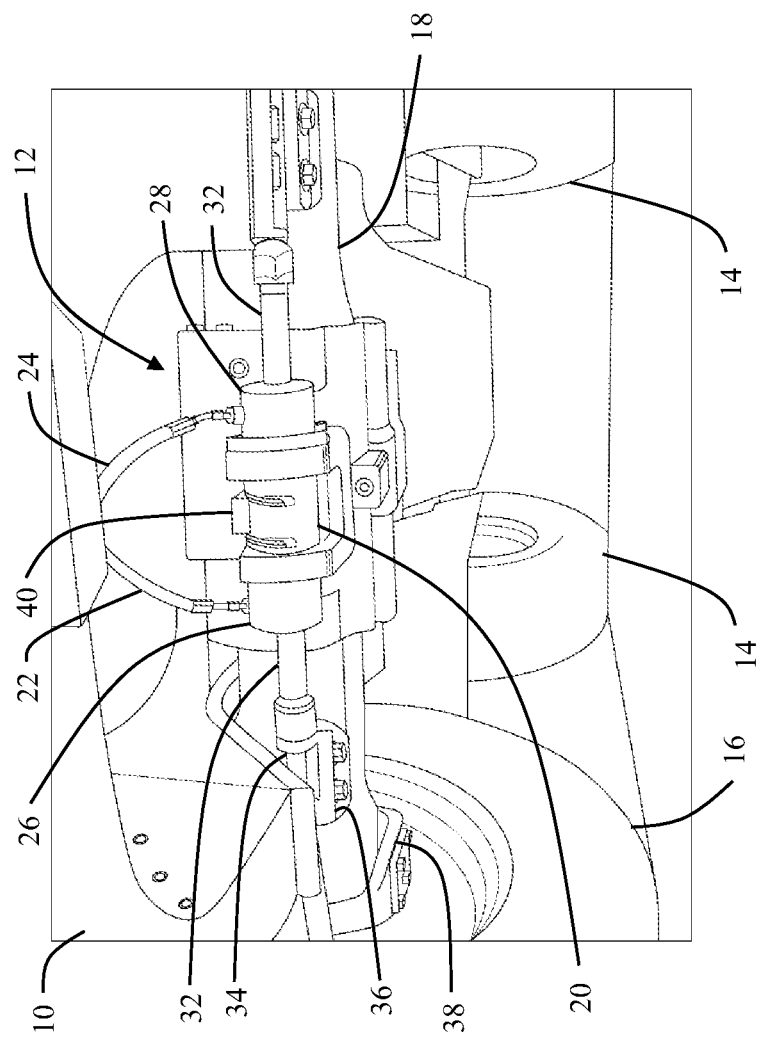
FIG. 1 is a perspective view of a rear portion of a machine, in accordance with the concepts of the present disclosure.

Referring to FIG. 1, there is shown a rear portion of a machine 10 equipped with a steering system 12. The steering system 12 includes a pair of front wheels 14 and a pair of rear wheels 16. The pair of front wheels 14 connects via a front axle (not shown). Similarly, the pair of rear wheels 16 connects via a rear axle 18. Each of the front axle (not shown) and the rear axle 18 are equipped with a double-acting axle cylinder 20. The axle cylinder 20 is shown fitted with a first fluid hose 22 and a second fluid hose 24, connected to a first end 26 and a second end 28 of the axle cylinder 20, respectively. Further, the axle cylinder 20 includes a piston 30 and a piston rod 32. The piston rod 32 is connected by a link 34 to a respective steering arm 36. The steering arms 36 are rigid with stub axles 38 connected to associated wheels and are pivotable about substantially vertical steering axes.

In addition, an axle alignment sensor assembly 40 is fixed on each of the front axle (not shown) and the rear axle 18. The axle alignment sensor assembly 40 is positioned proximally at a center of the axle cylinder 20. The axle alignment sensor assembly 40 detects steering motion of the rear wheels 16. Those skilled in the art will understand that this description of the rear axle 18 is equally applicable to the front axle (not shown).

Figure 2:
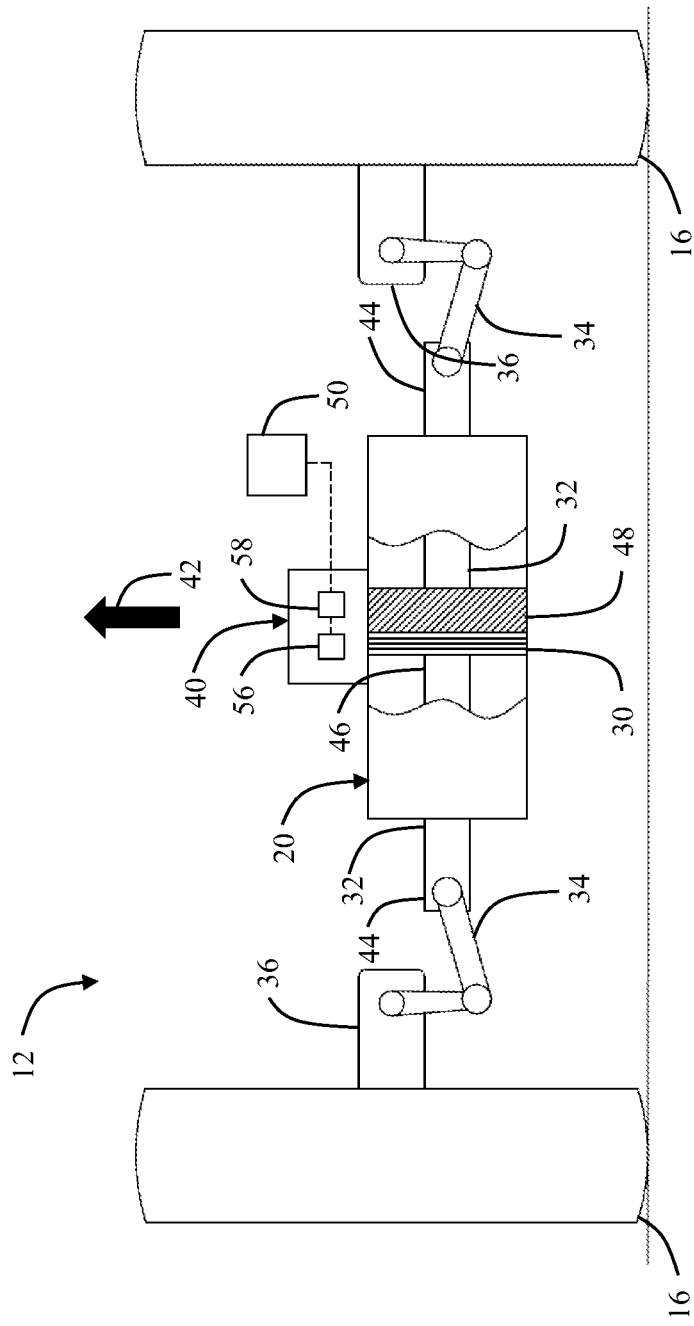
FIG. 2 is a schematic view of a pair of front wheels moving in a straight-ahead condition, in accordance with the concepts of the present disclosure.

In FIG. 2, the steering system 12 is shown with the rear wheels 16 in a straight-ahead condition. From a straight-ahead position, the rear wheels 16 can turn through a limited range in both directions of turning. An arrow 42 indicates the direction of straight-ahead forward motion of the machine 10. A cut-out is shown to illustrate components of the axle cylinder 20. A first end 44 of the piston rod 32 is connected to the steering arm 36. A second end 46 of the piston rod 32 is connected to the piston 30, which includes a magnetic ring 48.

The axle alignment sensor assembly 40 is fitted on to the axle cylinder 20 and coupled to the rear axle 18. The axle alignment sensor assembly 40 is in communication with a controller (not shown) of the machine 10, via a connector 50. The axle alignment sensor assembly 40 may be an inductive axle alignment sensor assembly 40. The axle alignment sensor assembly 40 includes a sensing end 52 and a connecting end 54. The axle alignment sensor assembly 40 is positioned near the axle cylinder 20 in such a way that the sensing end 52 is proximal to the center of the axle cylinder 20. In the current configuration, the sensing end 52 cooperates with the magnetic ring 48 of the piston 30, which is aligned at the center of the axle cylinder 20. The axle alignment sensor assembly 40 further includes a ferrite component 56 and an electrostatic discharge (ESD) protection component 58. The ferrite component 56 is included in the axle alignment sensor assembly 40 to prevent radio frequency interference, which may be caused due to external sources. The ESD protection component 58 is included in the axle alignment sensor assembly 40 to react to sudden or momentary overvoltage conditions.

Figure 3:
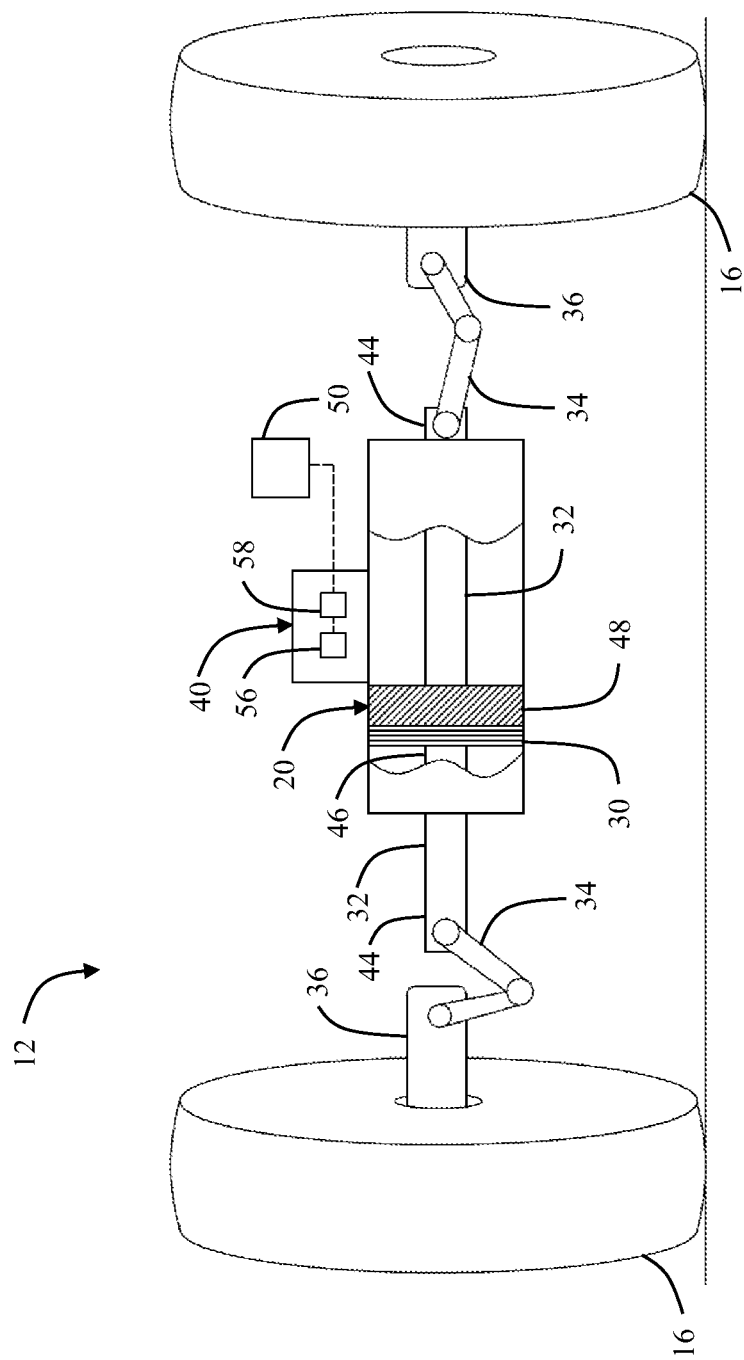
FIG. 3 is a schematic view of a pair of front wheels that are turning, in accordance with the concepts of the present disclosure.

Referring to FIG. 3, a view of the steering system 12 while turning is shown. The rear wheels 16 are shown in a turned or rotated position. As seen in FIG. 3, the rear wheels 16 are turned or rotated towards the right direction. Similar to FIG. 2, a cut-out is given to show the position of the piston 30 and the piston rod 32 inside the axle cylinder 20. This is a result of movement or motion of the piston 30 towards a left direction, that is, in a direction opposed to that of the direction of turn of the rear wheels 16. In this configuration, in order to turn the rear wheels 16 in the right direction the piston 30 is moved towards the extreme left of the axle cylinder 20. This results in a distanced position of the piston 30 from the axle alignment sensor assembly 40.

Figure 4:
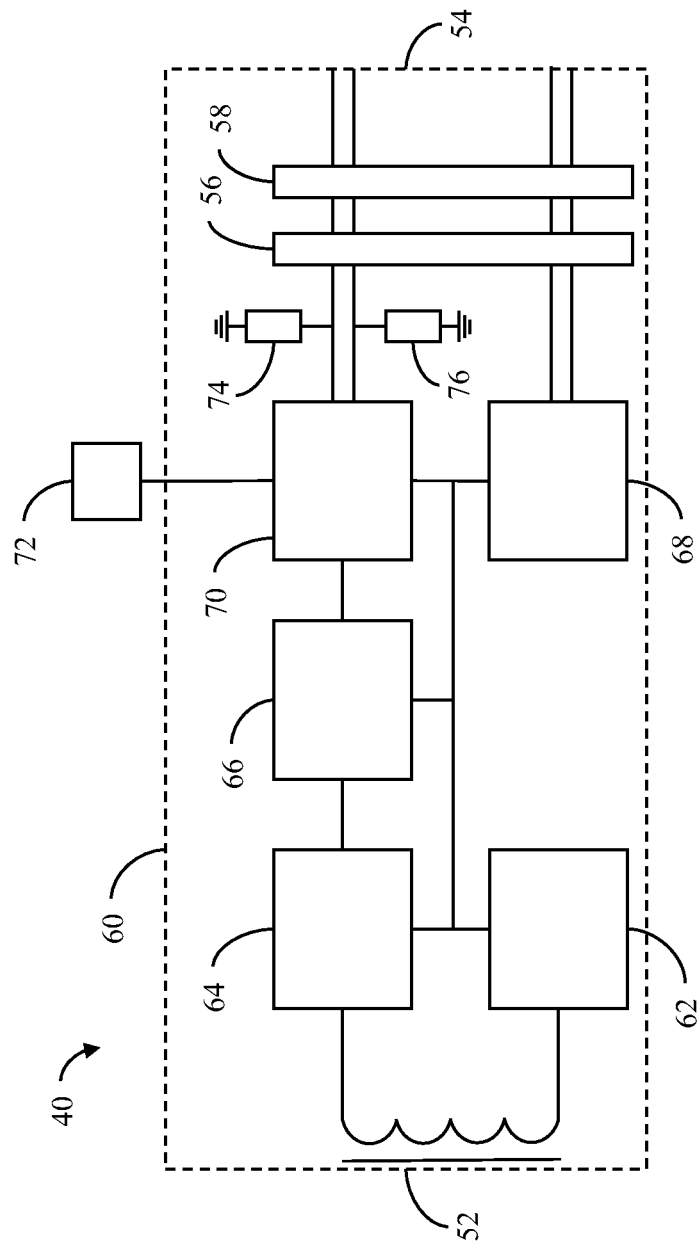
FIG. 4 is a block diagram of an axle alignment sensor assembly, in accordance with the concepts of the present disclosure.

Referring to FIG. 4, the axle alignment sensor assembly 40 is diagrammatically shown. The axle alignment sensor assembly 40 may include the ferrite component 56, the ESD protection component 58, an enclosure 60, an oscillator 62, a frequency detector 64, an analog-to-digital converter 66 (ADC), a voltage regulator 68, and an output switch driver 70. The enclosure 60 houses the above mentioned components. The oscillator 62 is positioned proximal to the sensing end 52. The oscillator 62 may include a capacitor and an inductor, between which current flows back and forth. The oscillator 62 is in communication with the voltage regulator 68 and the frequency detector 64. The frequency detector 64 is in communication with the ADC 66, which in turn is connected to the output switch driver 70. The output switch driver 70, along with the voltage regulator 68 is connected to the ESD protection component 58. The ferrite component 56 is positioned in series with the ESD protection component 58. The ESD protection component 58 and the ferrite component 56 are positioned proximal to the connecting end 54. Further, the output switch driver 70 is also connected to an indicator 72, which may be a light indicator or a sound indicator.

INDUSTRIAL APPLICABILITY

In operation, the controller (not shown) may receive input with respect to alignment of the front axle (not shown) and the rear axle 18. Signals indicative of axle positions may be sent to the controller (not shown). The axle positions may correspond to different steer modes. The steering system 12 is capable of operating in three different steer modes, such as two wheel steer mode, four wheel steer mode (also known as circle mode) and another four wheel steer mode (also known as crab mode). The steering system 12 is also capable of switching between any two of the above mentioned steer modes. Switching between two steer modes may be further determined by the axle positions of the front wheels 14 and the rear wheels 16. The steering system 12 may remain in a previously commanded mode until the axles are aligned, even if a request is made to select a particular steer mode. For this purpose, the steering system 12 is equipped with the axle alignment sensor assembly 40 to monitor axle alignment and to emit an alignment signal that corresponds to the axle position. For example, when the machine 10 moves in the straight-ahead path, the piston 30 is aligned at the center of the axle cylinder 20. Movement of the magnetic ring 48 close to the oscillator 62 results in creation of magnetic field.

Thus, an alternating current output is produced and fed to the frequency detector 64 and then to the ADC 66. At the ADC 66, the alternating current output is converted into a direct current output. This implies that a pulsating voltage is filtered into a steady direct current (DC) voltage. This DC voltage is then fed into the output switch driver 70, which functions to produce a first output 74 and a second output 76. The first output 74 may be low-level output such as 0 Volts. The second output 76 may be high-level output such as 12 Volts. In this case, the high-level output (12 Volts) is generated and fed to the indicator 72, which is then actuated to indicate a center alignment condition of the rear axle 18, that is, the straight-ahead condition of the rear wheels 16. This implies that the indicator 72 turns on when the rear wheels 16 are in the straight-ahead condition. Further, in an embodiment, the two outputs of the output switch driver 70 are grounded in order to stop the sensor output low level voltage signals from floating up high and causing the incorrect reading or fault at the controller (not shown).

When the rear wheels 16 are turning, the piston 30 will move towards one of the first end 26 and/or the second end 28 of the axle cylinder 20. This results in decline of the magnetic field around the oscillator 62. Hence, the DC voltage output from the ADC 66 is also reduced. In this case, a reduced DC output voltage is fed into the output switch driver 70. Thus, the low-level output is generated and the indicator 72 turns off, thereby indicating that the rear wheels 16 are turning. The above mentioned detection helps when the steer mode selection is made and the axle alignment is not in the required alignment, as then the controller (not shown) may signal the steering system 12 to bring the axles into required alignment, prior to switching between the two steer modes.

The disclosed axle alignment sensor assembly 40 includes an in-built ESD protection component 58 and the ferrite component 56. These components combat primary issues, such as overvoltage conditions and radio frequency interference. The ESD protection component 58 and the ferrite component 56 used in the disclosed axle alignment sensor assembly 40 have rated capacities, so as to meet compliance standards for off-highway machines. However, the existing ESD protection on the alignment sensors has a rating of 2 kilovolts, while the required standard rating for the off-highway electronics is 15 kilovolts. The rating of 15 kilovolts is achieved by the ESD protection component 58 of the disclosed axle alignment sensor assembly 40. Similarly, the existing alignment sensors are protected against the radio frequency interference by clipping the ferrite component 56 around a harness of an alignment sensor. The disclosed axle alignment sensor assembly 40 includes an in-built ferrite component 56.

The many features and advantages of the disclosure are apparent from the detailed specification, and thus, it is intended by the appended claims to cover all such features and advantages of the disclosure, which fall within the true spirit and scope thereof. Further, since numerous modifications and variations will readily occur to those skilled in the art, it is not desired to limit the disclosure to the exact construction and operation illustrated and described, and accordingly, all suitable modifications and equivalents may be resorted to that fall within the scope of the disclosure.

What is claimed is:

1. An axle alignment sensor assembly for a steering system of a machine, the machine including at least one axle cylinder, wherein the axle alignment sensor assembly is coupled to the at least one axle cylinder, the axle alignment sensor assembly includes a sensing end and a connecting end, the axle alignment sensor assembly comprising:
- an enclosure;
- an oscillator positioned at the sensing end, the oscillator configured to generate a magnetic field;
- a frequency detector positioned at the sensing end and in communication with the oscillator, the frequency detector configured to detect the magnetic field;
- an output switch driver positioned in communication with the frequency detector, the output switch driver configured to generate and deliver an output based on detection by the frequency detector;
- a ferrite component positioned proximal to the connecting end, the ferrite component configured to prevent electromagnetic interference; and
- an electrostatic discharge (ESD) protection component positioned between the ferrite component and the connecting end, the ESD protection component configured to protect the axle alignment sensor assembly in overvoltage conditions,
  - wherein the oscillator, the frequency detector, the output switch driver, the ferrite component, and the ESD protection component are enclosed within the enclosure.

2. The axle alignment sensor assembly of claim 1, wherein the output switch driver includes a first output and a second output, which are grounded to stop the sensor output low level voltage signals from floating up high and causing the incorrect reading.

\* \* \* \* \*